(12) United States Patent
Liu et al.

(10) Patent No.: US 10,688,882 B2
(45) Date of Patent: Jun. 23, 2020

(54) POWER SYSTEMS AND METHODS FOR ELECTRIC VEHICLES

(71) Applicant: NIO USA, Inc., San Jose, CA (US)

(72) Inventors: Xiaodong Liu, San Jose, CA (US); Bo Guo, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 330 days.

(21) Appl. No.: 15/721,428

(22) Filed: Sep. 29, 2017

(65) Prior Publication Data

US 2019/0100111 A1 Apr. 4, 2019

(51) Int. Cl.
| | |
|---|---|
| *B60L 58/20* | (2019.01) |
| *B60L 58/21* | (2019.01) |
| *B60R 16/033* | (2006.01) |
| *B60L 53/10* | (2019.01) |

(52) U.S. Cl.
CPC .............. *B60L 58/21* (2019.02); *B60L 53/11* (2019.02); *B60L 58/20* (2019.02); *B60R 16/033* (2013.01); *B60L 2210/10* (2013.01); *B60L 2210/40* (2013.01); *B60L 2240/527* (2013.01); *B60L 2240/547* (2013.01)

(58) Field of Classification Search
CPC .......... B60L 58/21; B60L 58/20; B60L 53/11; B60L 2240/527; B60L 2240/547; B60L 2210/40; B60L 2210/10; B60R 16/033
See application file for complete search history.

(56) References Cited

U.S. PATENT DOCUMENTS

| | | | |
|---|---|---|---|
| 5,602,459 A * | 2/1997 | Rogers | H02J 7/1423 320/138 |
| 5,995,380 A | 11/1999 | Maue et al. | |
| 8,129,952 B2 * | 3/2012 | Lee | H02J 7/0016 320/140 |
| 8,670,888 B1 | 3/2014 | Brenner | |
| 1,007,697 A1 | 9/2018 | Huang et al. | |
| 2009/0212626 A1 | 8/2009 | Snyder | |
| 2010/0065349 A1 * | 3/2010 | Ichikawa | B60L 3/0046 180/65.1 |
| 2012/0007557 A1 | 1/2012 | Hayashigawa | |
| 2015/0183328 A1 * | 7/2015 | Kusch | B60L 58/26 320/109 |
| 2016/0352131 A1 | 12/2016 | Nelson | |
| 2017/0012324 A1 | 1/2017 | Giordano et al. | |
| 2017/0141368 A1 | 5/2017 | Ricci | |
| 2017/0225588 A1 | 8/2017 | Newman | |

(Continued)

OTHER PUBLICATIONS

U.S. Appl. No. 15/654,583, filed Jul. 19, 2017, Chen et al.

(Continued)

*Primary Examiner* — Pinping Sun
(74) *Attorney, Agent, or Firm* — Sheridan Ross P.C.

(57) ABSTRACT

Embodiments include a power device for an electric vehicle. The power device includes a first bus associated with a first voltage, and a second bus associated with a second voltage, different than the first voltage. The power device includes a plurality of switching elements coupled to a first battery, a second battery, the first bus and the second bus. On/off states of the plurality of switching elements control electrical connections to the first bus, the second bus, the first battery and the second battery according to an operation mode.

20 Claims, 10 Drawing Sheets

(56) References Cited

U.S. PATENT DOCUMENTS

2017/0305291 A1* 10/2017 Koh ................. H02J 7/0027
2020/0023794 A1* 1/2020 Maekawa ............ H02J 7/00

OTHER PUBLICATIONS

U.S. Appl. No. 15/654,953, filed Jul. 20, 2017, Ing et al.
U.S. Appl. No. 15/712,532, filed Sep. 22, 2017, Ing et al.
Diebig et al., "Optimizing Multi-Voltage Automotive Power Supply Systems Using Electro-Thermal Simulation," EEHE, 2014, retrieved from http://www.bordsysteme.tu-dortmund.de/publications/2014_EEHE_Diebig_optimizing_multi_voltage_automotive_power_supply_systems_using_electro_thermal_simulation.pdf, 16 pages.
Official Action for U.S. Appl. No. 15/654,953, dated Feb. 7, 2019 6 pages.
Official Action for U.S. Appl. No. 15/654,583, dated Feb. 7, 2019 6 pages.
Official Action for U.S. Appl. No. 15/712,532, dated Sep. 5, 2019 12 pages.
Notice of Allowance for U.S. Appl. No. 15/654,953, dated May 23, 2019 5 pages.
Notice of Allowance for U.S. Appl. No, 15/654,583, dated May 22, 2019 5 pages.

* cited by examiner

US 10,688,882 B2

POWER SYSTEMS AND METHODS FOR ELECTRIC VEHICLES

FIELD

The present disclosure is generally directed to vehicle systems, and more particularly to vehicle power systems.

BACKGROUND

Most vehicles, in particular electric and hybrid vehicles, include power systems usually referred to as battery management systems (BMSs) that monitor and control the operation of the batteries within the vehicles. For example, the BMS of an electric vehicle acts as power source for the vehicle's powertrain as well as auxiliary components or features, such as heating and cooling components, dashboard electronics, etc. As the industry continues to develop, additional/alternative power systems are desired to support vehicle applications where higher voltage, e.g., 800V, becomes increasingly attractive to reduce battery charging time, improve power system efficiency to extend vehicle range and provide fail operational functionality.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

Figure 1:
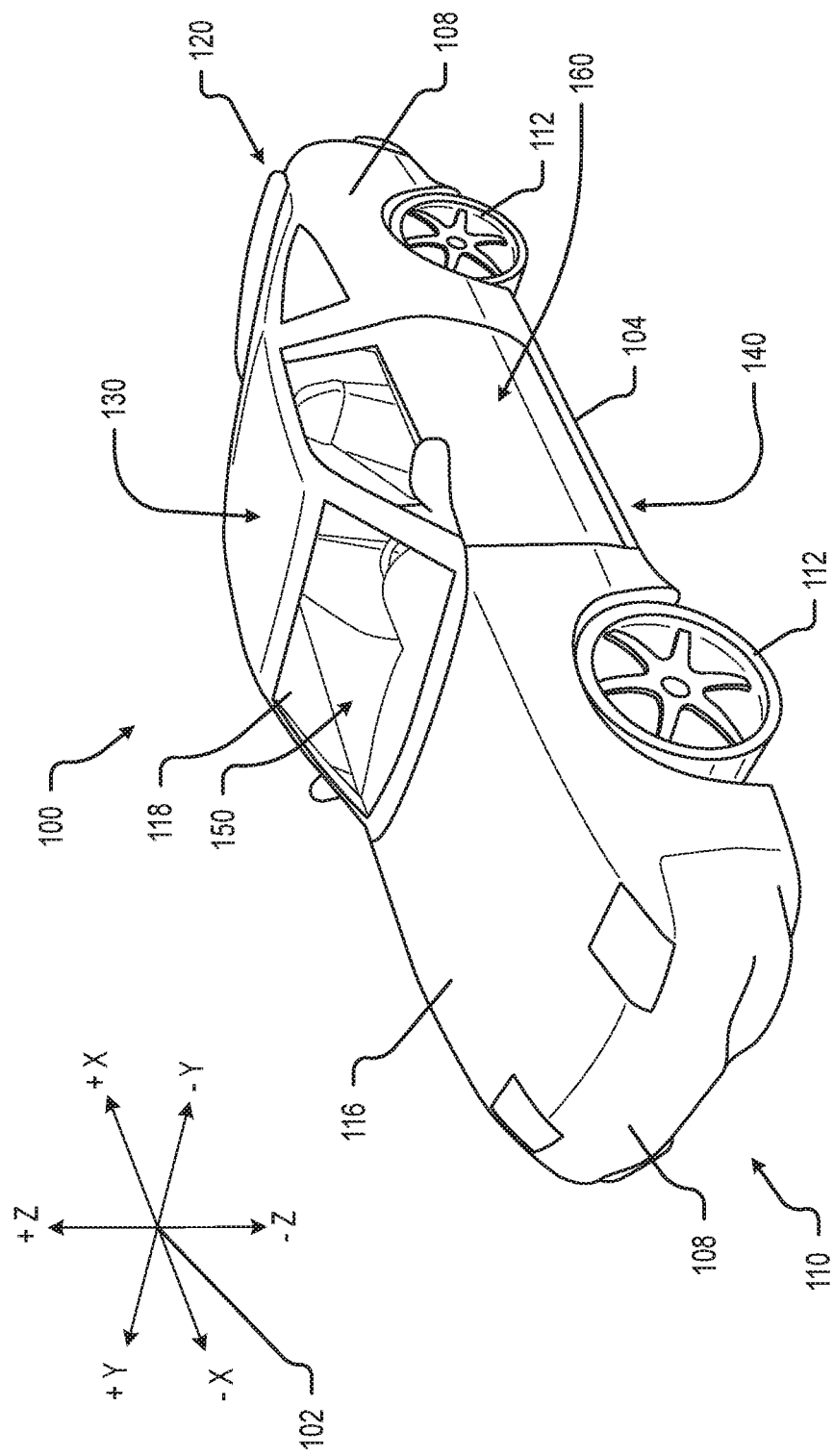
FIG. 1 shows a perspective view of a vehicle (or electric vehicle) in accordance with at least one example embodiment.

FIG. 1 shows a perspective view of a vehicle (or electric vehicle) 100 in accordance with example embodiments. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the −X direction relative to the other object or component. Conversely, an object is rearward of another object or component if the object is located in the +X direction relative to the other object or component.

The vehicle 100 may be, by way of example only, a battery electric vehicle (BEV) or a hybrid electric vehicle (HEV). Where the vehicle 100 is BEV, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is an HEV, the vehicle 100 may comprise the above described elements of a BEV with the addition of a gas-powered (or diesel-powered) engine and associated components in the front compartment (under the vehicle hood 116), which engine may be configured to drive either or both of the front wheels 112 and the rear wheels 112. In some embodiments where the vehicle 100 is an HEV, the gas-powered engine and associated components may be located in a rear compartment of the vehicle 100, leaving the front compartment available for storage or trunk space or for other uses. In some embodiments, the vehicle 100 may be, in addition to a BEV and an HEV, a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

The vehicle 100 may be capable of autonomous operation, wherein one or more processors receive information from various sensors around the vehicle and use that information to control the speed and direction of the vehicle 100 so as to avoid hitting obstacles and to navigate safely from an origin to a destination. In such embodiments, a steering wheel is unnecessary, as the one or more processors, rather than a vehicle occupant, control the steering of the vehicle 100.

Figure 2:
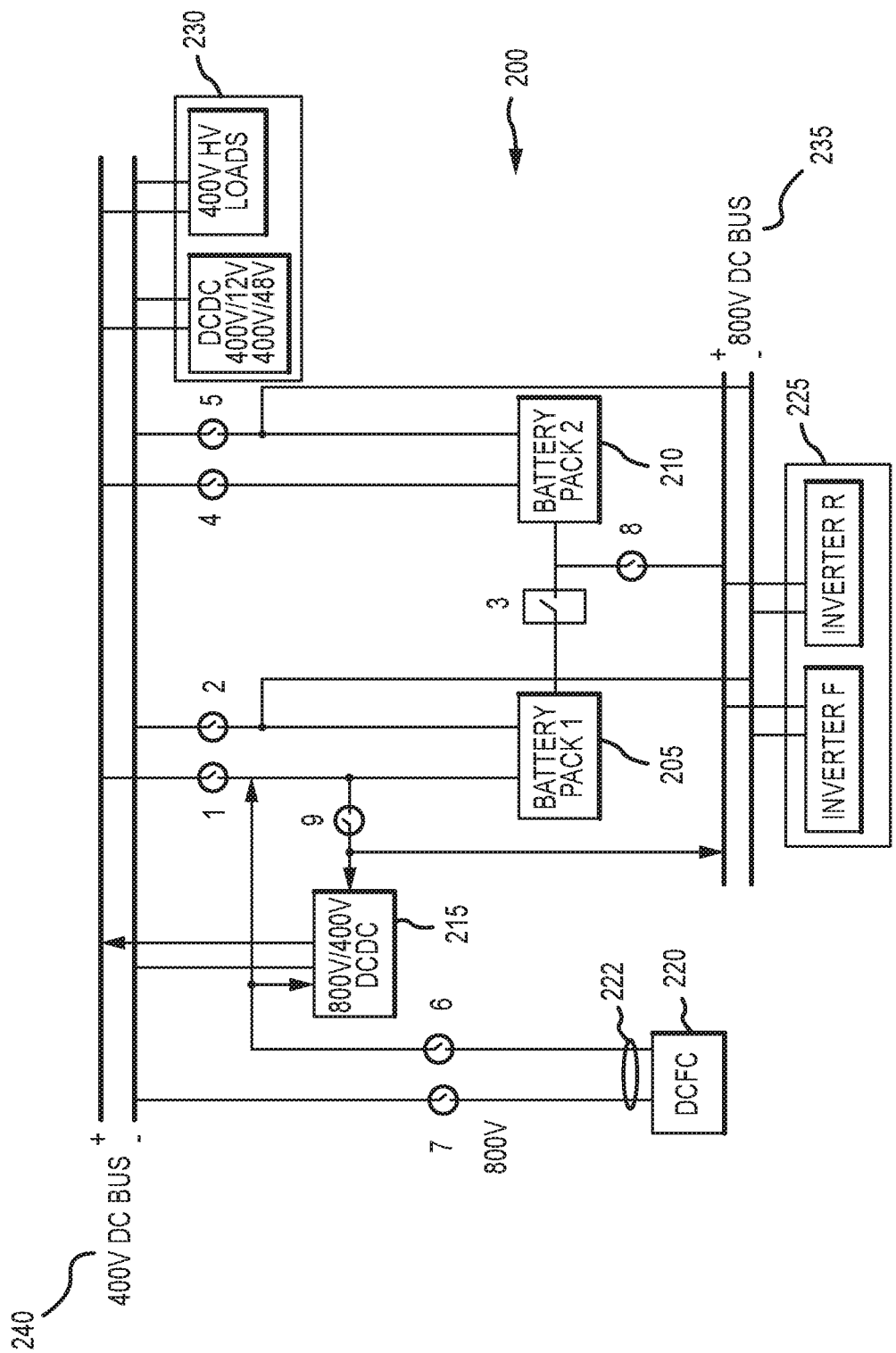
FIG. 2 is an example schematic of a power system of the electric vehicle in accordance with at least one example embodiment.

FIG. 2 is an example schematic of a power system 200 for the electric vehicle 100 in accordance with at least one example embodiment. The power system 200 acts as a main power source to overall operation of electric motor(s) and other high voltage components within the vehicle 100.

As shown in FIG. 2, the system 200 includes a first battery 205, a second battery 210, a voltage converter 215 (e.g., 10-20 kW), an external power source (or charger or DC fast charger (DCFC)) 220, a powertrain 225 (e.g., including at least two inverters and two electric motors), auxiliary components 230 (e.g., including a 400V/48V DCDC and/or a 400V/12V DCDC, and other 400V loads) and a plurality of switching elements (also referred to as switches or contactors) 1 to 9 (e.g., rated at 400 A each). The system 200 further includes a first bus 235 and a second bus 240. The first bus 235 is associated with a first voltage (e.g., 800V) and the second bus 240 is associated with a second voltage that is less than the first voltage (e.g., 400V).

The voltage converter 215 converts the first voltage (e.g., 800V) to the second voltage (e.g., 400V) that is less than the first voltage to power the auxiliary components 230, for example, while the vehicle 100 is charging during a charging mode. The voltage converter 215 may be a direct current (DC) to direct current converter (DCDC).

The powertrain 225 is coupled to the voltage converter 215, the first battery 205, and the second battery 210 so that the first battery 205 and the second battery 210 in series provide the first voltage (e.g., 800V) to the powertrain 225 to power the electric vehicle 100 with the first voltage while the vehicle 100 is operating in a driving mode.

The plurality of switching elements 1 to 9 are part of a power device (e.g., a junction box) in the electric vehicle 100. As shown in FIG. 2, the plurality of switching elements are coupled to the first battery 205, the second battery 210, the first bus 235 and the second bus 240. The powertrain 225 is coupled to the first bus 235. At least one controller controls the system 200 so that on/off states of the plurality of switching elements establish different electrical connections between the first bus 235, the second bus 240, the first battery 205 and the second battery 210 according to an operation mode. The controller is discussed in more detail with reference to FIG. 8. The different electrical connections and various operation modes are discussed in more detail with reference to FIGS. 3-10.

As shown in FIG. 2, a number of the plurality of switching elements may be equal to nine. However, example embodiments are not limited thereto, and it should be understood that fewer or additional switching elements may be used according to design preferences so long as the various operation modes described herein are possible.

FIG. 2 further shows that the plurality of switching elements includes a first pair of switching elements 6 and 7 coupled to a charging port 222 that receives the first voltage from external power source 220. The plurality of switching elements includes a second pair of switching elements 1 and 2 coupled to the first battery 205, and a third pair of switching elements 4 and 5 coupled to the second battery 210. FIG. 2 also shows a first switching element 3 coupled between the first battery 205 and the second battery 210, a second switching element 8 coupled to the first switching element 3 and the second battery 210, and a third switching element 9 coupled to the first battery 205, one of the first pair of switching elements (e.g., switch 1), and the first bus 235.

Figure 7:
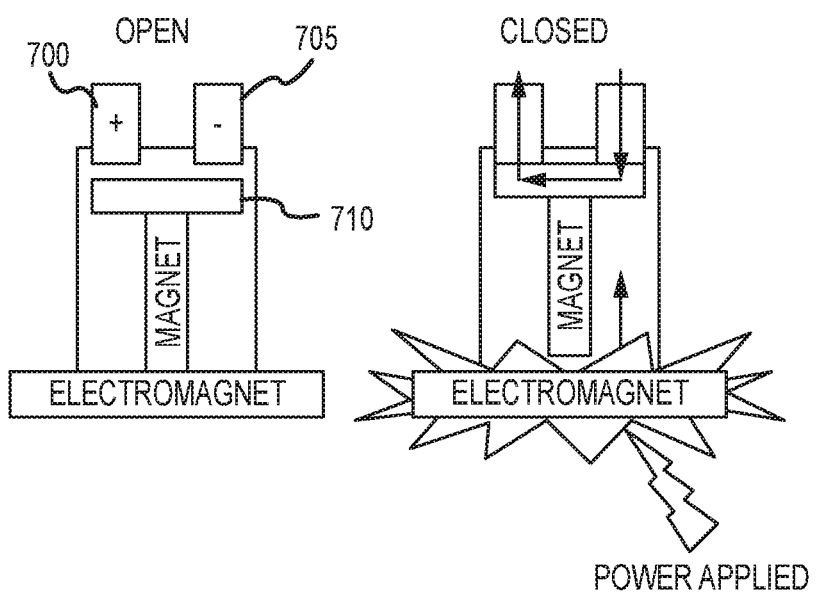
FIG. 7 illustrates an example structure of the switching elements in FIGS. 2-6.

According to at least one example embodiment, the first, second, and third pairs of switching elements are first, second, and third pairs of electromagnetic switches (see FIG. 7). Each of the first pair of electromagnetic switches 6 and 7, the second pair of electromagnetic switches 1 and 2, and the third pair of electromagnetic switches 4 and 5 includes i) a first electromagnetic switch (e.g., 7, 2, and 5) coupled to negative terminals of one or more of the charging port 222, the first battery 205, and the second battery 210, and ii) a second electromagnetic switch (e.g., 6, 1, and 4) coupled to positive terminals of one or more of the charging port 222, the first battery 205, and the second battery 210.

The second electromagnetic switch of the first pair of electromagnetic switches (e.g., 6), the second electromagnetic switch of the second pair of electromagnetic switches (e.g., 1), and the third switching element 9 are coupled to the voltage converter 215 that converts the first voltage to the second voltage.

As shown, the first switching element 3 is coupled to a negative terminal of the first battery 205 and the positive terminal of the second battery 210, the second switching element 8 is coupled to positive terminals of the second battery 210 and the first bus 235, and the third switching element 9 is coupled to positive terminals of the first battery 205 and the first bus 235.

Although not explicitly shown, it should be understood that various elements of the system 200 may be attached to a support substrate (e.g., a printed circuit board (PCB)) or other suitable substrate. For example, the support substrate may support the plurality of switching elements 1 to 9 and at least portions of the first and second buses 235/240.

FIG. 2 further illustrates that batteries 205 and 210 are separate battery packs. However, it should be further understood that the first battery 205 and the second battery 210 may be a single battery pack tapped at locations that effectively split the single battery pack into two batteries.

Figure 3:
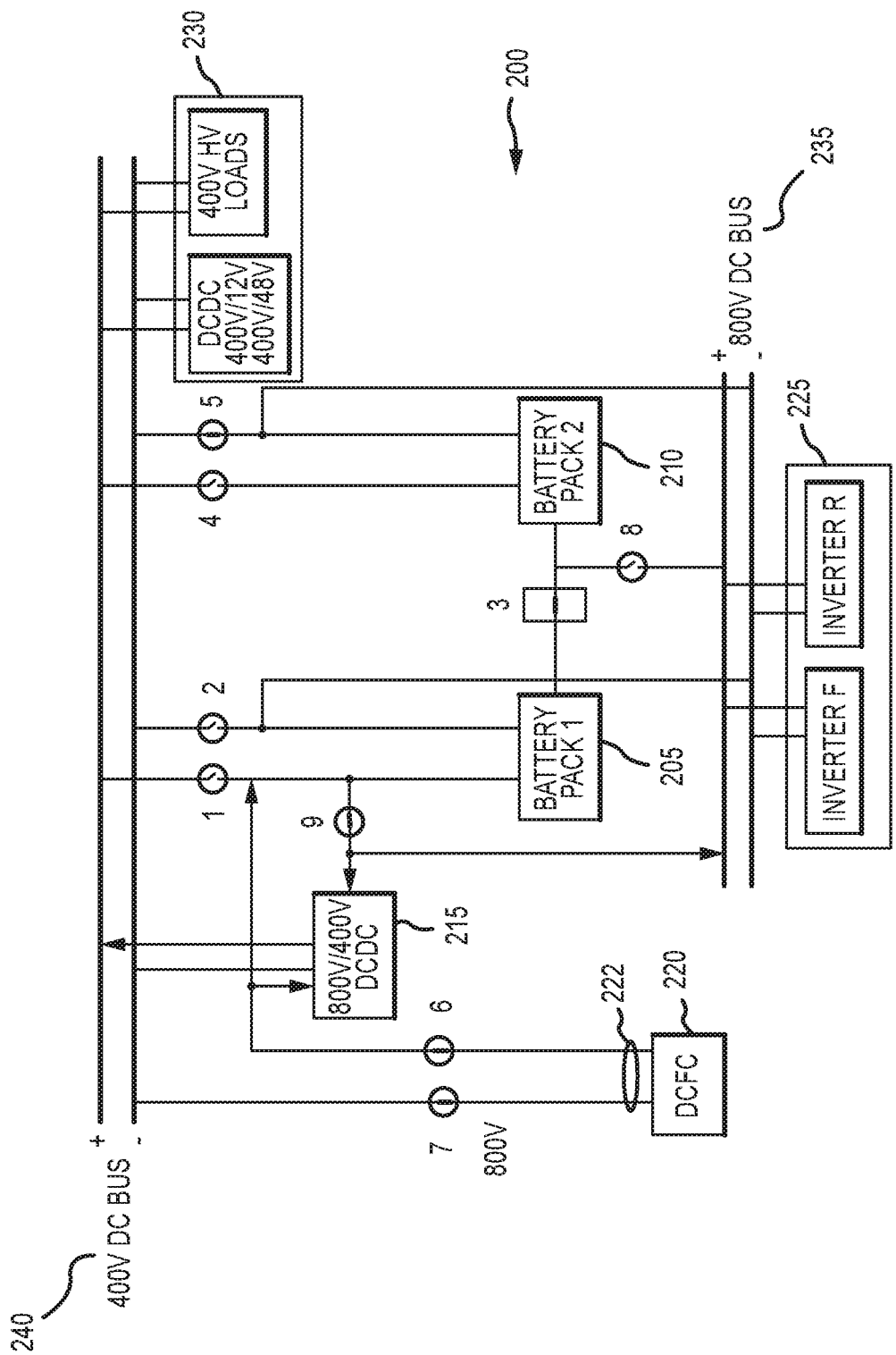
FIG. 3 illustrates connections of the power system in FIG. 2 for a charging mode of the electric vehicle in accordance with at least one example embodiment.

FIG. 3 illustrates connections of the power system 200 in FIG. 2 for a charging mode of the electric vehicle 100 in accordance with at least one example embodiment.

When the operation mode is a charging mode in which the vehicle 100 is being charged, the on/off states of the plurality of switching elements are such that the first battery 205 and the second battery 210 charge with the first voltage from an external power source 220. As shown in FIG. 3, switches 3, 5, 6, 7, and 9 are closed (ON) while switches 1, 2, 4, and 8 are open (OFF). This effectively connects the batteries 205/210 in series with the external power source 220 to allow for fast charging (e.g., 800V fast charging).

Figure 4:
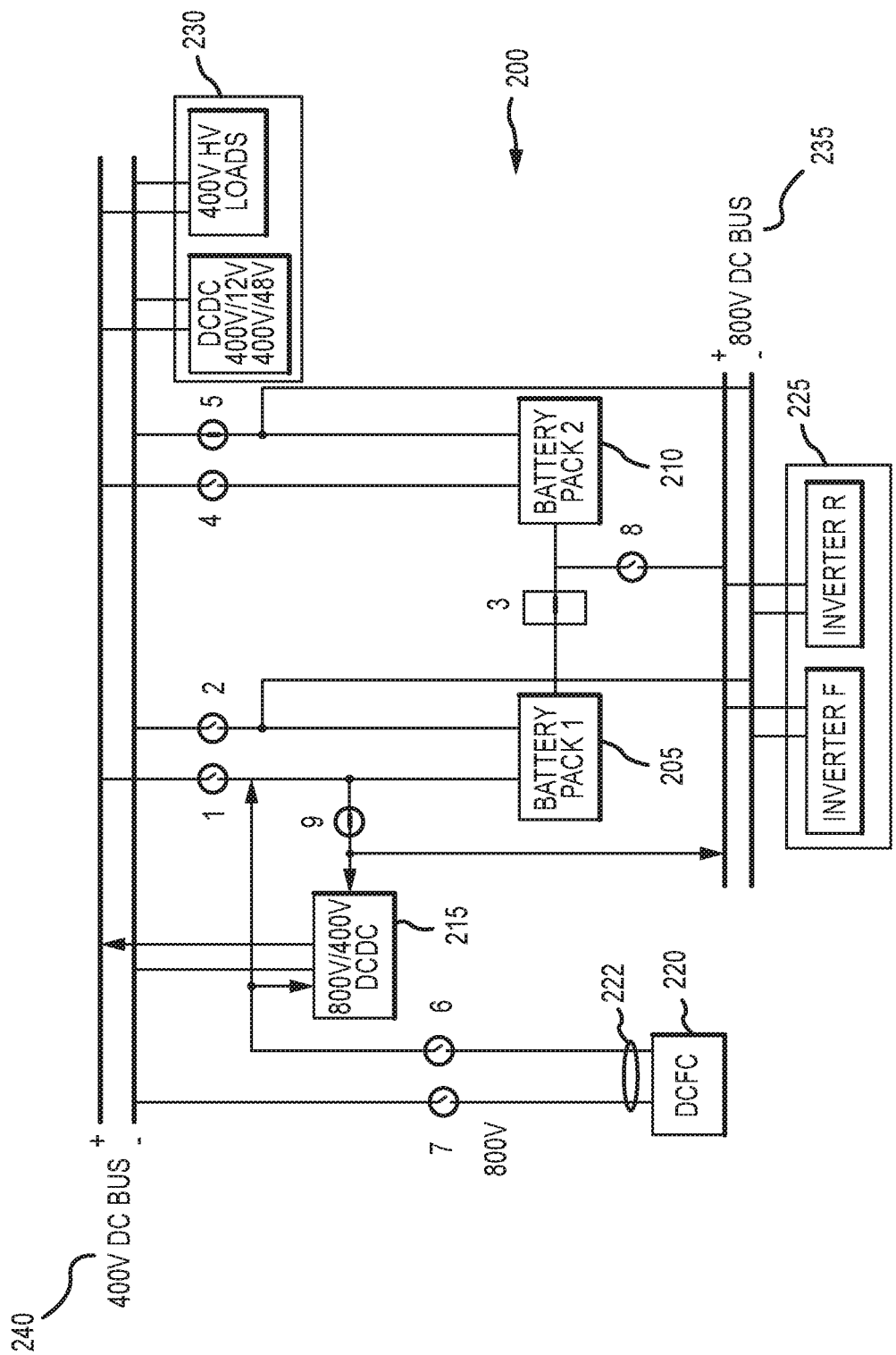
FIG. 4 illustrates connections of the power system in FIG. 2 for a first driving mode of the electric vehicle in accordance with at least one example embodiment.

FIG. 4 illustrates connections of the power system 200 in FIG. 2 for a first driving mode of the electric vehicle 100 in accordance with at least one example embodiment. The first driving mode may correspond to a mode in which the powertrain 225 uses the first voltage to power the vehicle 100. That is, when the operation mode is the first driving mode, the on/off states of the plurality of switching elements are such that the first battery 205 and the second battery 210 power the powertrain 225 according to the first voltage (e.g., 800V). Here, switches 3, 5, and 9 are closed (ON) while switches 1, 2, 4, 6, 7, and 8 are open (OFF). This effectively connects the batteries 205/210 in series with the powertrain 225.

Figure 5:
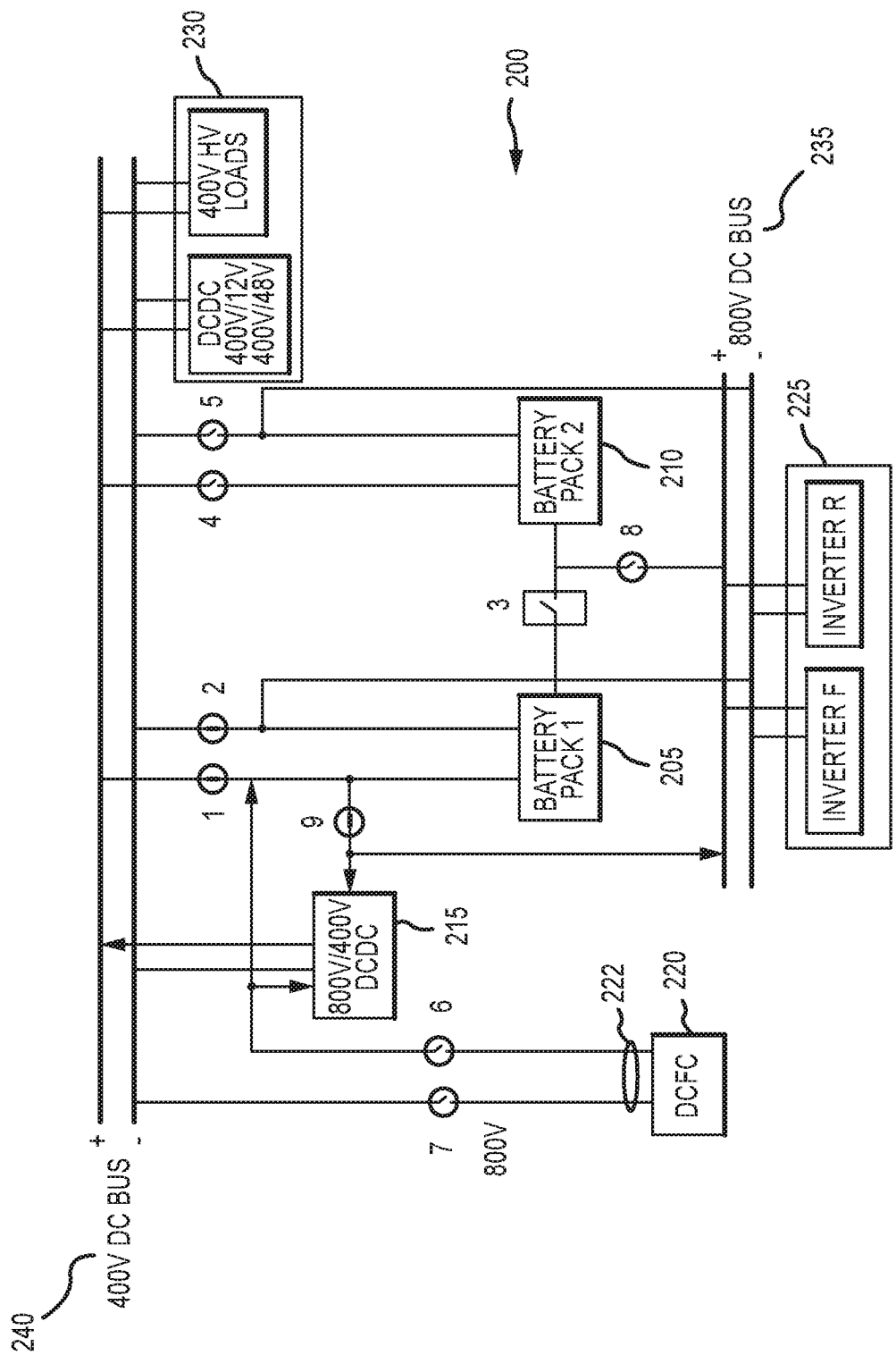
FIG. 5 illustrates connections of the power system in FIG. 2 for a second driving mode of the electric vehicle in accordance with at least one example embodiment.

FIG. 5 illustrates connections of the power system in FIG. 2 for a second driving mode of the electric vehicle in accordance with at least one example embodiment. The second driving mode may correspond to a mode in which the powertrain 225 uses the second voltage to power the vehicle 100. For example, when the operation mode is a second driving mode, the on/off states of the plurality of switching elements are such that the first battery 205 powers the powertrain 225 according to the second voltage (e.g., 400V). Here, switches 1, 2, 9 are closed (ON) while switches 3, 4, 5, 6, 7, and 8 are open (OFF). This effectively removes the second battery 210 from the active circuit to prevent the second battery 210 from powering the powertrain 225. The second driving mode may be a mode in which the second battery 210 has failed.

Figure 6:
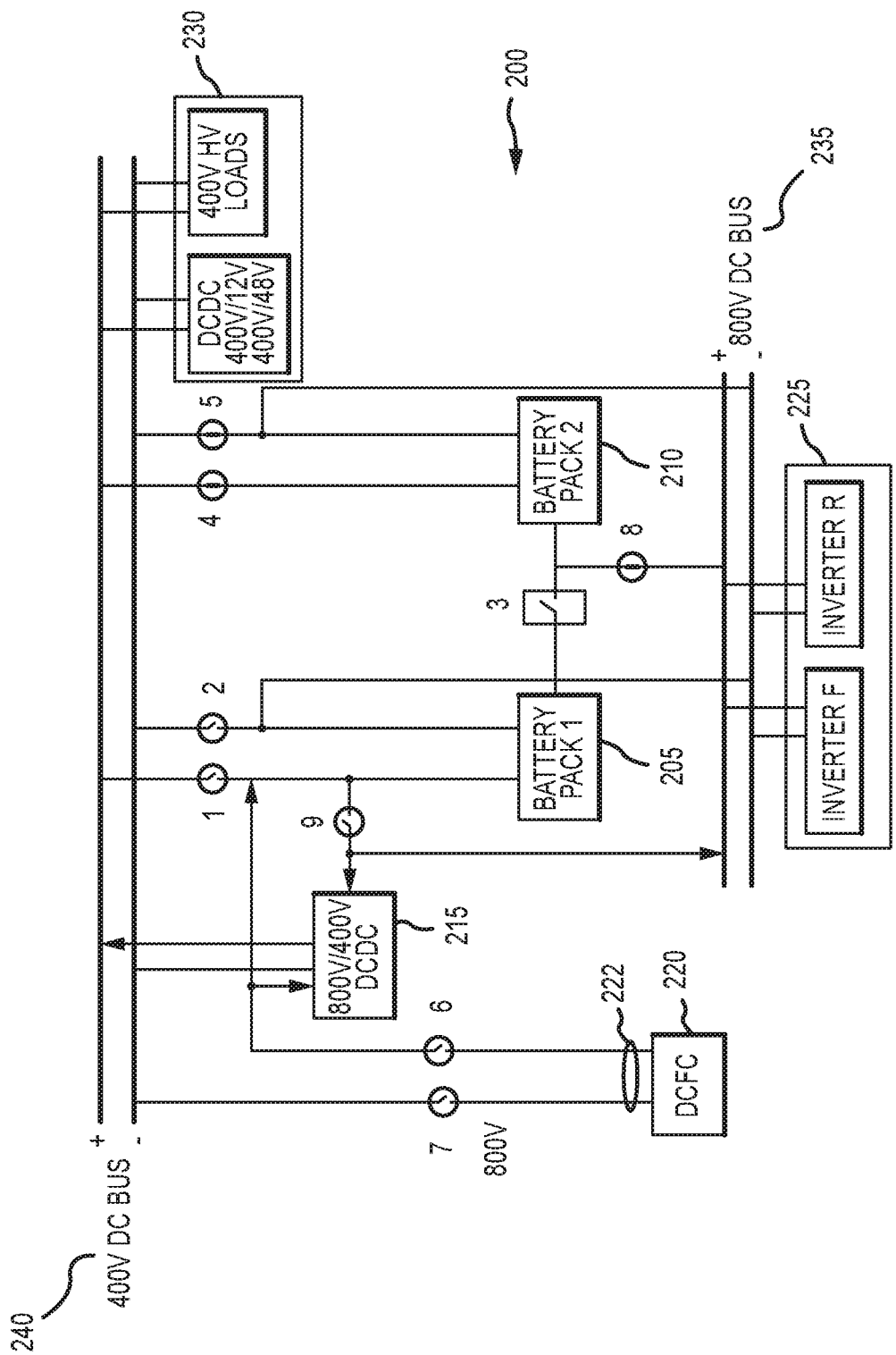
FIG. 6 illustrates connections of the power system in FIG. 2 for a third driving mode of the electric vehicle in accordance with at least one example embodiment.

FIG. 6 illustrates connections of the power system 200 in FIG. 2 for a third driving mode of the electric vehicle 100 in accordance with at least one example embodiment. The third driving mode may correspond to a mode in which the powertrain 225 uses the second voltage to power the vehicle 100. For example, when the operation mode is a third driving mode, the on/off states of the plurality of switching elements are such that the second battery 210 powers the powertrain 225 according to the second voltage (e.g., 400V). Here, switches 4, 5, and 8 are closed (ON) while switches 1, 2, 3, 6, 7, and 9 are open (OFF). This effectively removes the first battery 205 from the active circuit to prevent the first battery 205 from powering the powertrain 225. The third driving mode may be a mode in which the first battery 205 has failed.

FIG. 7 illustrates an example of a switching element according to an example embodiment. As shown in FIG. 7, a switching element (e.g., from switching elements 1 to 9) may be an electromagnetic switch with a first connection terminal 700 and a second connection terminal 705 to receive physical wire connections. The electromagnetic switch may include a plunger 710 movable between a first position and a second position based on an applied electromagnetic field. For example, during normal operation, the plunger 710 is in a first, open position if no field is applied, and in a second, closed position upon application of a field (e.g., supplied by a power source).

Figure 8:
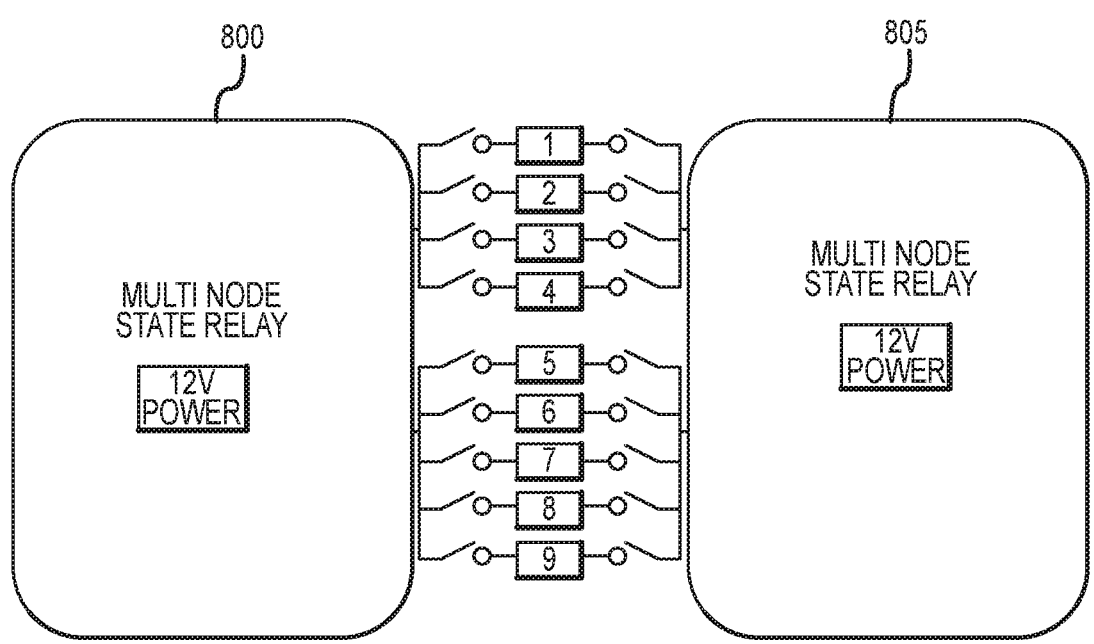
FIG. 8 illustrates an example structure of a controller to control the system of FIGS. 2-6 in accordance with at least one example embodiment.

FIG. 8 illustrates an example structure of a controller for the systems of FIGS. 2-6. As discussed with reference to FIGS. 2-6, the system 200 may be controlled by at least one controller (e.g., a high voltage controller (HVC)). According to at least one example embodiment, the at least one controller is a first controller (or HVC L) 800 and a second controller 805 (or HVC R). As shown in FIG. 8, the first controller 800 is associated with the first battery 205 and operable to individually select the plurality of switching elements 1 to 9. The second controller 805 is associated with the second battery 210 and operable to individually select the plurality of switching elements 1 to 9. The first controller 800 and the second controller 805 may be implemented by one or more processors or microprocessors executing instructions on a computer readable medium. Additionally or alternatively, the first and second controllers 800/805 may be implemented by hardware, such as an application specific integrated circuit (ASIC).

In the event of a failure of either the first controller 800 or the second controller 805, the other of the first controller 800 and the second controller 805 controls the plurality of switching elements 1 to 9. In order to do so, the first controller 800 includes a first multi-node relay coupled to the plurality of switching elements 1 to 9, and the second controller includes a second multi-node relay coupled to the plurality of switching elements 1 to 9. The first controller 800 and the second controller 805 individually select the plurality of switching elements through the first multi-node relay and the second multi-node relay, respectively (e.g., under control of the ASIC and/or one or more microprocessors). The first and second multi-node relays may be part of the auxiliary components 230 and powered by a 12V power supply. In FIG. 8, the 800V mode refers to the charging mode and the 400V mode refers to the driving mode.

It should be understood that one of controllers 800 and 805 may be omitted if desired.

Figure 9:
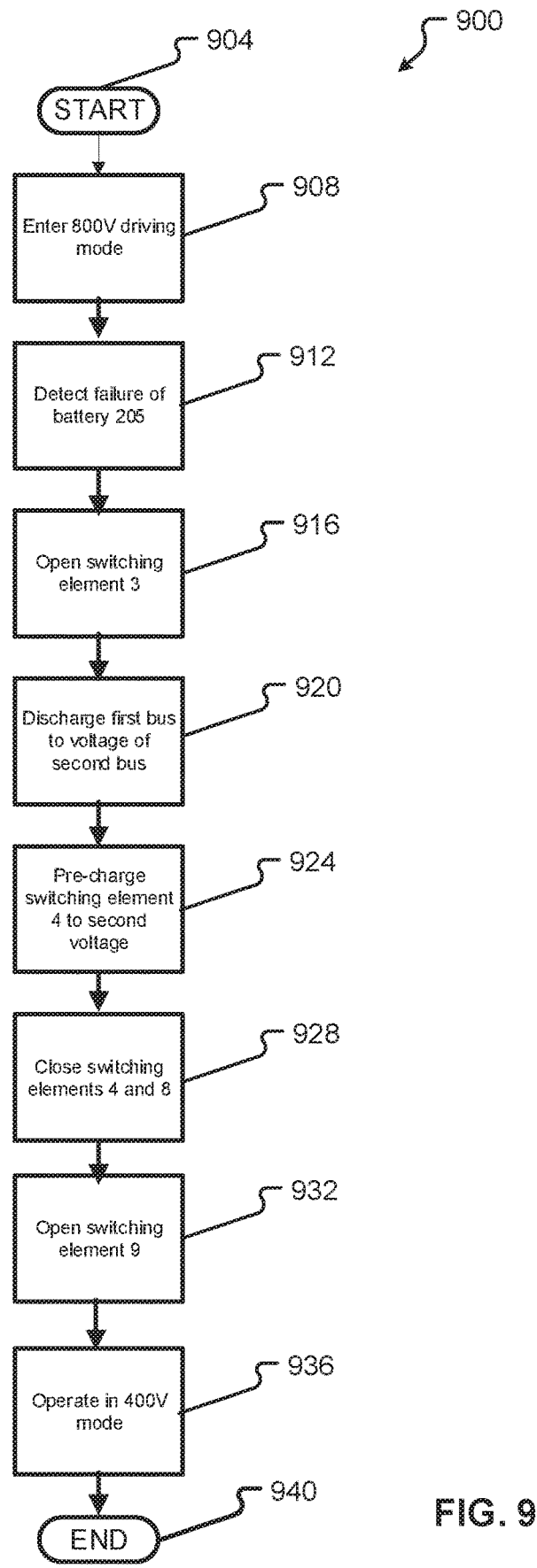
FIG. 9 illustrates is a flow diagram illustrating example operations of the system(s) in FIGS. 2-8 in accordance with at least one example embodiment.

FIG. 9 is a flow diagram illustrating example operations of the system(s) in FIGS. 2-8. In more detail, the operations of FIG. 9 are carried out to result in the connections shown in FIG. 6 (i.e., where the first battery 205 has failed).

While a general order for the steps of the method 900 is shown in FIG. 9, the method 900 can include more or fewer steps or can arrange the order of the steps differently than those shown in FIG. 9. Generally, the method 900 starts at operation 904 and ends at operation 940. The method can be executed as a set of computer-executable instructions executed by the controller(s) 800/805 and encoded or stored on a computer readable medium. Alternatively, the operations discussed with respect to FIG. 9 may be implemented by the various elements of the system(s) FIGS. 2-8. Hereinafter, the FIG. 9 shall be explained with reference to the systems, components, assemblies, devices, user interfaces, environments, software, etc. described in conjunction with FIGS. 1-8.

In operation 908, the vehicle 100 enters an 800V driving mode (e.g., where both batteries 205/210 power the powertrain 225 at 800V).

In operation 912, the method 900 detects a failure of the first battery 205.

In operation 916, the method 900 opens switching element 3.

In operation 920, the method 900 discharges the first bus 235 to a voltage of the second bus 240 (e.g., the second voltage 400V). The discharge may occur through the powertrain 225 or other suitable discharge mechanism, such as a capacitance.

In operation 924, the method 900 pre-charges switching element 4 to the second voltage (i.e., the voltage of the second bus 240). Here, the second voltage may be 400V.

In operation 928, the method 900 closes switching elements 4 and 8.

In operation 932, the method 900 opens switching element 9.

In operation 936, the vehicle 100 enters the 400V driving mode where only the second battery 210 powers the powertrain 225.

Figure 10:
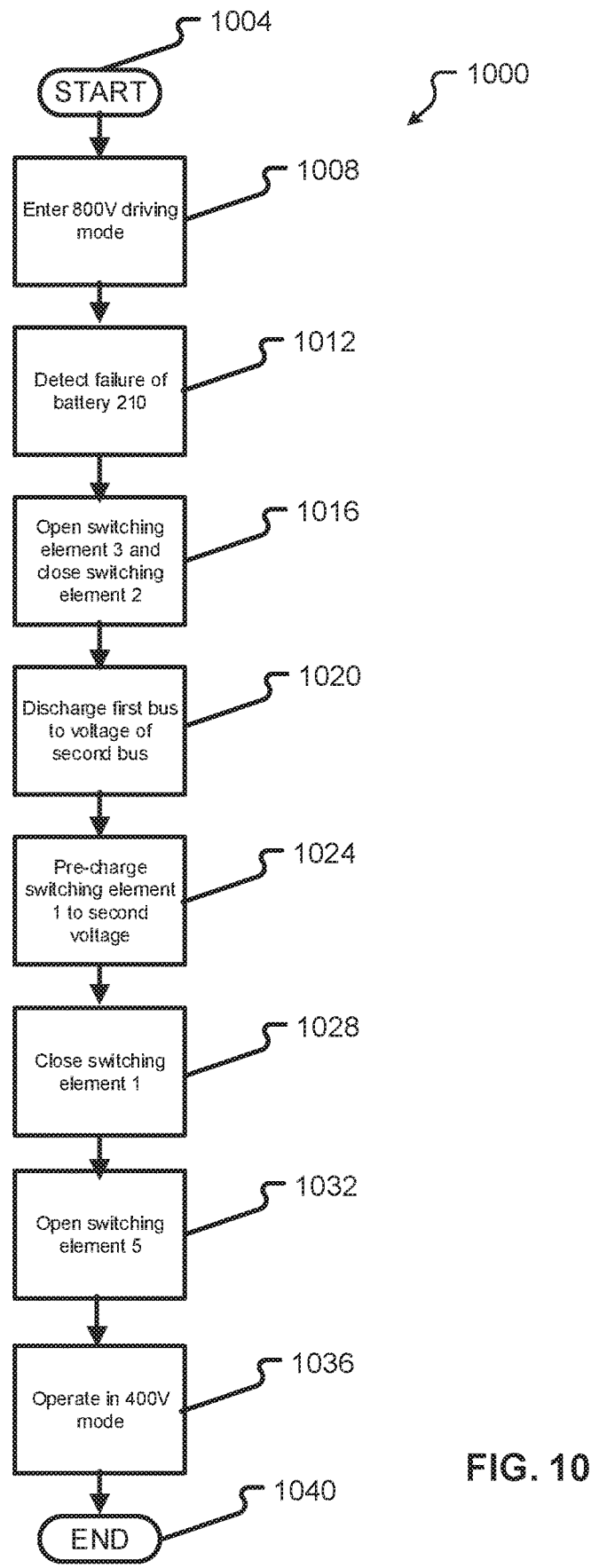
FIG. 10 is a flow diagram illustrating example operations of the system(s) in FIGS. 2-8 in accordance with at least one example embodiment.

FIG. 10 is a flow diagram illustrating example operations of the system(s) in FIGS. 2-8. In more detail, the operations of FIG. 10 are carried out to result in the connections shown in FIG. 5 (i.e., where the second battery 210 has failed).

While a general order for the steps of the method 1000 is shown in FIG. 10, the method 1000 can include more or fewer steps or can arrange the order of the steps differently than those shown in FIG. 10. Generally, the method 1000 starts at operation 1004 and ends at operation 1020. The method can be executed as a set of computer-executable instructions executed by the controller(s) 700/705 and encoded or stored on a computer readable medium. Alternatively, the operations discussed with respect to FIG. 10 may be implemented by the various elements of the system(s) FIGS. 2-9. Hereinafter, the FIG. 10 shall be explained with reference to the systems, components, assemblies, devices, user interfaces, environments, software, etc. described in conjunction with FIGS. 1-9.

In operation 1008, the vehicle 100 enters an 800V driving mode (e.g., where both batteries 205/210 power the powertrain 225 at 800V).

In operation 1012, the method 1000 detects a failure of the second battery 210.

In operation 1016, the method 1000 opens switching element 3 and closes switching element 2.

In operation 1020, the method 1000 discharges the first bus 235 to a voltage of the second bus 240 (e.g., the second voltage 400V). The discharge may occur through the powertrain 225 or other suitable discharge mechanism, such as a capacitance.

In operation 1024, the method 1000 pre-charges switching element 1 to the second voltage (i.e., the voltage of the second bus 240). Here, the second voltage may be 400V.

In operation 1028, the method 1000 closes switching element 1.

In operation 1032, the method 1000 opens switching element 5.

In operation 1036, the vehicle 100 enters the 400V driving mode where only the first battery 205 powers the powertrain 225.

In view of the above description, it may be said the at least one controller 800/805 follows a first sequence of operations for the plurality of switching elements when the first battery fails (e.g., FIG. 9), and follows a second sequence of operations for the plurality of switching elements when the second battery fails (e.g., FIG. 10). As described, the first sequence of operations and the second sequence of operations each include controlling the plurality of switching elements to i) discharge the first bus to the second voltage with the powertrain, and ii) pre-charge one of the plurality of switching elements to the second voltage.

It should be further understood that example embodiments include a method of operating an electric vehicle 100. The method includes determining an operation mode of the electric vehicle. The method includes controlling on/off states of a plurality of switching elements that are coupled to a first battery 205, a second battery 210, and a powertrain 225 according to the determined operation mode such that i) in a first driving mode, the on/off states of the plurality of switching elements such that the first battery and the second battery power the powertrain according to a first voltage (see FIG. 4), ii) in a second driving mode, the on/off states of the plurality of switching elements are such that the first battery powers the powertrain according to a second voltage (see FIGS. 5 and 10), iii) in a third driving mode, the on/off states of the plurality of switching elements are such that the second battery powers the powertrain according to the second voltage (see FIGS. 6 and 9), and iv) in a charging mode, the on/off states of the plurality of switching elements are such that the first battery and the second battery charge with the first voltage from an external power source (see FIG. 3). As noted above, the first voltage is greater than the second voltage.

Although example embodiments have been discussed with reference to specific voltage/current values, it should be understood that example embodiments are not limited thereto. For example, example embodiments may also be applied to vehicle systems that charge/operate at different voltages/currents than those specifically referenced herein.

In view of the foregoing description, it should be appreciated that one or more example embodiments provide a power system(s) for an electric vehicle that has dual battery packs and a switch configuration that allows for fast charging and multiple driving modes. Example embodiments also provide safety mechanisms in the event of battery/controller failure. Further, example embodiments may reduce cost and footprint of the power system as well as the overall weight of the vehicle (e.g., by using fewer switching elements). One or more example embodiments also provide a flexible power architecture that can be altered by removing/adding battery packs.

Embodiments include a power device for an electric vehicle. The power device includes a first bus associated with a first voltage, and a second bus associated with a second voltage, different than the first voltage. The power device includes a plurality of switching elements coupled to a first battery, a second battery, the first bus and the second bus. On/off states of the plurality of switching elements control electrical connections to the first bus, the second bus, the first battery and the second battery according to an operation mode.

Aspects of the power device include that the second voltage is less than the first voltage.

Aspects of the power device include that the first voltage is 800V and the second voltage is 400V.

Aspects of the power device include that when the operation mode is a charging mode, the on/off states of the plurality of switching elements are such that the first battery and the second battery charge with the first voltage from an external power source.

Aspects of the power device include that when the operation mode is a first driving mode, the on/off states of the plurality of switching elements are such that the first battery and the second battery power a powertrain according to the first voltage.

Aspects of the power device include that when the operation mode is a second driving mode, the on/off states of the plurality of switching elements are such that the first battery powers the powertrain according to the second voltage.

Aspects of the power device include that when the operation mode is a third driving mode, the on/off states of the plurality of switching elements are such that the second battery powers the powertrain according to the second voltage.

Aspects of the power device include that the second driving mode is a mode in which the second battery has failed, and the third driving mode are is a mode in which the first battery has failed.

Aspects of the power device include that a number of the plurality of switching elements is equal to nine.

Aspects of the power device include that the plurality of switching elements includes a first pair of switching elements coupled to a charging port that receives the first voltage from external power source, a second pair of switching elements coupled to the first battery, a third pair of switching elements coupled to the second battery, a first switching element coupled between the first battery and the second battery, a second switching element coupled to the first voltage bus and the second battery, and a third switching element coupled to the first battery, a voltage converter that converts the first voltage to the second voltage, and the first bus.

Aspects of the power device include that the first, second, and third pairs of switching elements are first, second, and third pairs of electromagnetic switches. Each of the first pair of electromagnetic switches, the second pair of electromagnetic switches, and the third pair of electromagnetic switches are electromagnetic includes i) a first electromagnetic switch coupled to negative terminals of one or more of the charging port, the first battery, and the second battery, and ii) a second electromagnetic switch coupled to positive terminals of one or more of the charging port, the first battery, and the second battery.

Aspects of the power device include that the first switching element is coupled to a negative terminal of the first battery and a positive terminal of the second battery, the second switching element is coupled to positive terminals of the second battery and the first bus, and wherein the third switching element is coupled to positive terminals of the first battery and the first bus.

Aspects of the power device include that the second electromagnetic switch of the first pair of electromagnetic switches, the second electromagnetic switch of the second pair of electromagnetic switches, and the third switching element are coupled to the voltage converter that converts the first voltage to the second voltage.

Embodiments include a power system for an electric vehicle. The system includes a voltage converter to convert a first voltage to a second voltage, a first battery, a second battery, and a power device. The power device includes a first bus associated with the first voltage, a second bus associated with the second voltage, and a plurality of switching elements coupled to the first battery, the second battery, the first bus and the second bus. The system includes a powertrain coupled to the first bus, and at least one controller that controls on/off states of the plurality of switching elements to establish different electrical connections between the first bus, the second bus, the first battery and the second battery according to an operation mode.

Aspects of the system include that the first voltage is greater than the second voltage.

Aspects of the system include that when the operation mode is a first driving mode, the at least one controller controls the on/off states of the plurality of switching elements such that the first battery and the second battery power the powertrain according to the first voltage. When the operation mode is a second driving mode or a third driving mode, the at least one controller controls the on/off states of the plurality of switching elements such that either the first battery or the second battery power the powertrain according to the second voltage.

Aspects of the system include that when the operation mode is a charging mode, the at least one controller controls the on/off states of the plurality of switching elements such that the first battery and the second battery charge with the first voltage from an external power source.

Aspects of the system include that the second driving mode is a mode in which the second battery has failed, and the third driving mode is a mode in which the first battery has failed.

Aspects of the system include that the at least one controller follows a first sequence of operations for the plurality of switching elements when the first battery fails, and follows a second sequence of operations for the plurality of switching elements when the second battery fails.

Aspects of the system include that the first sequence of operations and the second sequence of operations each include controlling the plurality of switching elements to i) discharge the first bus to the second voltage with the powertrain, and ii) pre-charge one of the plurality of switching elements to the second voltage.

Embodiments include a method of operating an electric vehicle. The method includes determining an operation mode of the electric vehicle. The method includes controlling on/off states of a plurality of switching elements that are coupled to a first battery, a second battery, and a powertrain according to the determined operation mode such that i) in a first driving mode, the on/off states of the plurality of switching elements such that the first battery and the second battery power the powertrain according to a first voltage, ii) in a second driving mode, the on/off states of the plurality of switching elements are such that the first battery powers the powertrain according to a second voltage, iii) in a third driving mode, the on/off states of the plurality of switching elements are such that the second battery powers the powertrain according to the second voltage, and iv) in a charging mode, the on/off states of the plurality of switching elements are such that the first battery and the second battery charge with the first voltage from an external power source. The first voltage is greater than the second voltage.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A power device for an electric vehicle, comprising:
a first bus associated with a first voltage;
a second bus associated with a second voltage, different than the first voltage; and
a plurality of switching elements coupled to a first battery, a second battery, the first bus, and the second bus, on/off states of the plurality of switching elements controlling electrical connections to the first bus, the second bus, the first battery and the second battery according to an operation mode,
wherein the plurality of switching elements includes:
a first pair of switching elements coupled to a charging port that receives the first voltage from an external power source;
a second pair of switching elements coupled to the first battery;
a third pair of switching elements coupled to the second battery;
a first switching element coupled between the first battery and the second battery;
a second switching element coupled to the first bus and the second battery; and
a third switching element coupled to the first battery, a voltage converter that converts the first voltage to the second voltage, and the first bus.

2. The power device of claim 1, wherein the second voltage is less than the first voltage.

3. The power device of claim 2, wherein the first voltage is 800V and the second voltage is 400V.

4. The power device of claim 2, wherein, when the operation mode is a charging mode, the on/off states of the plurality of switching elements are such that the first battery and the second battery charge with the first voltage from the external power source.

5. The power device of claim 4, wherein, when the operation mode is a first driving mode, the on/off states of the plurality of switching elements are such that the first battery and the second battery power a powertrain according to the first voltage.

6. The power device of claim 5, wherein, when the operation mode is a second driving mode, the on/off states of the plurality of switching elements are such that the first battery powers the powertrain according to the second voltage, and
wherein, when the operation mode is a third driving mode, the on/off states of the plurality of switching elements are such that the second battery powers the powertrain according to the second voltage.

7. The power device of claim 6, wherein the second driving mode is a mode in which the second battery has failed, and the third driving mode is a mode in which the first battery has failed.

8. The power device of claim 1, wherein a number of the plurality of switching elements is equal to nine.

9. The power device of claim 1, wherein the first, second, and third pairs of switching elements are first, second, and third pairs of electromagnetic switches, and wherein each of the first pair of electromagnetic switches, each of the second pair of electromagnetic switches, and each of the third pair of electromagnetic switches includes i) a first electromagnetic switch coupled to negative terminals of one or more of the charging port, the first battery, and the second battery, and ii) a second electromagnetic switch coupled to positive terminals of one or more of the charging port, the first battery, and the second battery.

10. The power device of claim 1, wherein the first switching element is coupled to a negative terminal of the first battery and a positive terminal of the second battery, wherein the second switching element is coupled to the positive terminal of the second battery and a positive terminal of the first bus, and wherein the third switching element is coupled to a positive terminal of the first battery and the positive terminal of the first bus.

11. The power device of claim 9, wherein the second electromagnetic switch of the first pair of electromagnetic switches, the second electromagnetic switch of the second pair of electromagnetic switches, and the third switching element are coupled to the voltage converter that converts the first voltage to the second voltage.

12. A system for an electric vehicle, comprising:
a voltage converter to convert a first voltage to a second voltage;
a first battery;
a second battery;
a power device, including:
a first bus associated with the first voltage;
a second bus associated with the second voltage; and
a plurality of switching elements coupled to the first battery, the second battery, the first bus, and the second bus;
a powertrain coupled to the first bus; and
at least one controller that controls on/off states of the plurality of switching elements to establish different electrical connections between the first bus, the second bus, the first battery and the second battery according to an operation mode,
wherein the plurality of switching elements includes:
a first pair of switching elements coupled to a charging port that receives the first voltage from an external power source;
a second pair of switching elements coupled to the first battery;
a third pair of switching elements coupled to the second battery;
a first switching element coupled between the first battery and the second battery;
a second switching element coupled to the first bus and the second battery; and
a third switching element coupled to the first battery, the voltage converter that converts the first voltage to the second voltage, and the first bus.

13. The system of claim 12, wherein the first voltage is greater than the second voltage.

14. The system of claim 13, wherein, when the operation mode is a first driving mode, the at least one controller controls the on/off states of the plurality of switching elements such that the first battery and the second battery power the powertrain according to the first voltage,
wherein, when the operation mode is a second driving mode or a third driving mode, the at least one controller controls the on/off states of the plurality of switching elements such that either the first battery or the second battery power the powertrain according to the second voltage.

15. The system of claim 14, wherein, when the operation mode is a charging mode, the at least one controller controls the on/off states of the plurality of switching elements such that the first battery and the second battery charge with the first voltage from the external power source.

16. The system of claim 14, wherein the second driving mode is a mode in which the second battery has failed, and the third driving mode is a mode in which the first battery has failed.

17. The system of claim 16, wherein the at least one controller follows a first sequence of operations for the plurality of switching elements when the first battery fails, and follows a second sequence of operations for the plurality of switching elements when the second battery fails.

18. The system of claim 17, wherein the first sequence of operations and the second sequence of operations each include controlling the plurality of switching elements to i) discharge the first bus to the second voltage with the powertrain, and ii) pre-charge one of the plurality of switching elements to the second voltage.

19. A method of operating an electric vehicle, comprising:
determining an operation mode of the electric vehicle; and
controlling on/off states of a plurality of switching elements that are coupled to a first battery, a second battery, and a powertrain according to the determined operation mode such that i) in a first driving mode, the on/off states of the plurality of switching elements are such that the first battery and the second battery power the powertrain according to a first voltage, ii) in a second driving mode, the on/off states of the plurality of switching elements are such that the first battery powers the powertrain according to a second voltage, iii) in a third driving mode, the on/off states of the plurality of switching elements are such that the second battery powers the powertrain according to the second voltage, and iv) in a charging mode, the on/off states of the plurality of switching elements are such that the first battery and the second battery charge with the first voltage from an external power source,
wherein the first voltage is greater than the second voltage,
wherein the plurality of switching elements includes:
a first pair of switching elements coupled to a charging port that receives the first voltage from the external power source;
a second pair of switching elements coupled to the first battery;
a third pair of switching elements coupled to the second battery;
a first switching element coupled between the first battery and the second battery;
a second switching element coupled to a first bus associated with the first voltage and the second battery; and
a third switching element coupled to the first battery, a voltage converter that converts the first voltage to the second voltage, and the first bus associated with the first voltage.

20. The method of claim 19, wherein the first voltage is 800V and the second voltage is 400V.

* * * * *